(12) United States Patent
Gomi

(10) Patent No.: US 6,970,212 B1
(45) Date of Patent: Nov. 29, 2005

(54) ELECTRO-OPTICAL DEVICE AND METHOD FOR FABRICATING THE SAME, AND PROJECTION DISPLAY DEVICE

(75) Inventor: Yoshiyuki Gomi, Chimo (JP)

(73) Assignee: Seiko Epson Corporation, Tokoy (JP)

( * ) Notice: Subject to any disclaimer, the term of this patent is extended or adjusted under 35 U.S.C. 154(b) by 0 days.

(21) Appl. No.: 09/347,523

(22) Filed: Jul. 6, 1999

(30) Foreign Application Priority Data

Jul. 14, 1998 (JP) ................................ 10-199133

(51) Int. Cl.[7] ..................... G02F 1/1335; G02F 1/1339
(52) U.S. Cl. ...................... 349/95; 349/153; 349/190
(58) Field of Search ......................... 349/95, 42, 5–8, 349/153–154, 110, 190

(56) References Cited

U.S. PATENT DOCUMENTS

| | | | | |
|---|---|---|---|---|
| 5,682,215 A | * | 10/1997 | Nishihara et al. | 349/95 |
| 5,701,008 A | * | 12/1997 | Ray et al. | 250/352 |
| 5,764,323 A | * | 6/1998 | Fukuda | 349/95 |
| 6,031,591 A | * | 2/2000 | Hamanaka | 349/95 |
| 6,057,897 A | * | 5/2000 | Ichikawa et al. | 349/42 |
| 6,069,740 A | * | 5/2000 | Hamanaka | 359/620 |
| 6,271,900 B1 | * | 8/2001 | Li | 349/95 |
| 6,330,044 B1 | * | 12/2001 | Murade | 349/95 |

FOREIGN PATENT DOCUMENTS

| | | |
|---|---|---|
| JP | 05-333328 | 12/1993 |
| JP | A-8-328002 | 12/1996 |
| JP | 10-96802 A | 4/1998 |

* cited by examiner

Primary Examiner—Dung T. Nguyen
(74) Attorney, Agent, or Firm—Oliff & Berridge, PLC

(57) ABSTRACT

An electro-optical device is disclosed in which dimensional accuracy in a space between an opposite substrate and an electro-optical device substrate is increased, and thus, display quality is enhanced by improving the structure in which a lens array substrate and a sheet covering the lens array substrate are adhered to each other on the side of the opposite substrate. In a liquid crystal apparatus, an opposite substrate includes a lens array substrate provided with a step portion equal in height to microlenses in the region overlapping the region in which a sealing material is formed, and a glass sheet adhered to the lens array substrate by an adhesive. In the region overlapping the region in which the sealing material is formed, since the lens array substrate and the glass sheet are adhered to each other with a thin layer of the adhesive, the opposite substrate and a liquid crystal apparatus substrate can be adhered to each other with a space therebetween having high dimensional accuracy without any problem.

5 Claims, 11 Drawing Sheets

RELATED ART

ELECTRO-OPTICAL DEVICE AND METHOD FOR FABRICATING THE SAME, AND PROJECTION DISPLAY DEVICE

BACKGROUND OF THE INVENTION

1. Field of Invention

The present invention relates to an electro-optical device in which an electro-optical material such as a liquid crystal is enclosed between a substrate for an electro-optical device, such as a liquid crystal apparatus provided with a plurality of pixels formed in a matrix and an opposite substrate. More particularly, the present invention relates to an electro-optical device in which microlenses are formed on an opposite substrate, and a method for fabricating the same.

2. Description of Related Art

As shown in FIG. 11, a liquid crystal apparatus as an example of electro-optical devices substantially includes a liquid crystal apparatus substrate 30 provided with a pixel electrode 8 and a thin film transistor (hereinafter referred to as TFT) 10 for pixel-switching, an opposite substrate 20 provided with an opposite electrode 32, and a liquid crystal 39 as an electro-optical material enclosed and retained between the substrates. The liquid crystal apparatus substrate 30 and the opposite substrate 20 are adhered to each other with a given space therebetween by a sealing material 52 containing a gap material, and the liquid crystal 39 is enclosed in the space. Accordingly, in the liquid crystal apparatus substrate 30, by image signals applied to the pixel electrode 8 from a data line (not shown in the drawing) through the TFT 10, the alignment conditions of the liquid crystal 39 between the pixel electrode 8 and the opposite electrode 32 can be controlled. Therefore, in a transmissive liquid crystal apparatus, light incident on the side of the opposite substrate 20 is aligned into a predetermined linearly polarized light by an incident side polarizer (not shown in the drawing), and then enters the layer of the liquid crystal 39 from the side of the opposite substrate 20. The linearly polarized light passing through one region is emitted from the liquid crystal apparatus substrate 30 with the polarization axis of the transmitted light being twisted, while the linearly polarized light passing through another region is emitted from the liquid crystal apparatus substrate 30 with the polarization axis of the transmitted light not being twisted. Therefore, one of the linearly polarized light in which the polarization axis has been twisted by the liquid crystal 39 and the linearly polarized light in which the polarization axis has not been twisted passes through an outgoing side polarizer (not shown in the drawing). Thus, by controlling the polarization conditions in each pixel, predetermined information can be displayed.

When incident light from the opposite substrate 20 side enters a channel forming region (not shown in the drawing) of the TFT 10, a photoelectric current occurs in the region by a photoelectric conversion effect, resulting in a deterioration of transistor characteristics of the TFT 10. Therefore, generally, a light-shielding film 6 referred to as a black matrix or black mask composed of a metallic material such as chromium or a resin black is formed on the opposite substrate 20 at the position opposing each TFT 10. However, although the light-shielding film 6 must be formed widely in order to securely prevent light from entering the channel forming region of the TFT by means of the light-shielding film 6, if such a wide light-shielding film 6 is formed, the amount of light for display decreases. Even if the wide light-shielding film 6 is formed, oblique incident light cannot be shielded securely.

Such being the case, a structure in which microlenses L (small condenser lenses) are arrayed on the side of the opposite substrate 20 in the longitudinal direction has been invented. In such a structure, since incident light entering from the opposite substrate 20 side can be condensed toward each pixel electrode 8 by the respective microlenses L, even if the width of the light-shielding film 6 formed on the opposite substrate 20 side is narrow, or there is no light-shielding film 6 on the opposite substrate 20 side, light can be prevented from entering the channel forming region of the TFT 10. Thus, as the deterioration of transistor characteristics of the TFT 10 and the decrease in the amount of light for display can be prevented, reliable liquid crystal apparatuses which produce a bright display can be fabricated.

A method for fabricating such an opposite substrate 20 includes the steps of producing a lens array substrate LA in which a plurality of microlenses L are formed by etching the surface of a transparent substrate using a photolithographic technique, and then adhering a glass sheet 49 as a transparent cover to the lens array substrate LA by an adhesive 48. That is, in the conventional lens array substrate LA, since the entire region is etched excluding a portion in which microlenses L are formed, a peripheral region LB of the region in which microlenses L are formed is also etched, the peripheral region LB being lower in height comparison with the microlenses L. With respect to the opposite substrate 20, an opposite electrode 32 and a light-shielding film 6 are formed, in that order, on the surface of the glass sheet 49 adhered to the lens array substrate LA, and then, a polyimide resin 47 is applied thinly thereon and thermally cured at temperatures of approximately 150 to 200° C., followed by rubbing. With respect to the liquid crystal apparatus substrate 30, after the TFT 10 and the pixel electrode 8 are formed, in that order, a polyimide resin 46 is applied thinly thereon and thermally cured at temperatures of approximately 150 to 200° C., followed by rubbing. Then, after a sealing material 52 containing a gap material is applied to the surface of the liquid crystal apparatus substrate 30 in the region which overlaps the peripheral region LB of the opposite substrate 20, the opposite substrate 20 and the liquid crystal apparatus substrate 30 are adhered together with the sealing material 52. The step of adhering the opposite substrate 20 and the liquid crystal apparatus substrate 30 together is important in determining a space between the substrates. Generally, the sealing material 52 is preliminarily cured by emitting light on the sealing material 52 from the side of the opposite substrate 20 while the opposite substrate 20 is being pressed to the liquid crystal apparatus substrate 30 to secure a given space between the opposite substrate 20 and the liquid crystal apparatus substrate 30, and then the sealing material 52 is post-cured.

In the known lens array substrate LA, however, since the peripheral region LB in the region in which microlenses L are formed is lower in height in comparison with the microlenses L, various adverse effects are caused because the cover (glass sheet) 49 is adhered to the lens array substrate LA with a significantly thick adhesive 48. For example, when the opposite substrate 20 and the liquid crystal apparatus substrate 30 are adhered together with the sealing material 52, even if the opposite substrate 20 is pressed to the liquid crystal apparatus substrate 30, the thick adhesive 48 functions as a cushion in the peripheral region LB, and thus, a space (cell gap) between the opposite substrate 20 and the liquid crystal apparatus substrate 30 cannot be controlled. As a result, display quality deteriorates in the liquid crystal apparatus.

Also, with respect to the fabrication of the opposite substrate 20, if the adhesive 48 in the peripheral region LB is thick when the polyimide resin 47 as an alignment layer is thermally cured, warpage, waviness, or the like may occur in the opposite substrate 20 because of stress due to the adhesive 48. In such a case, the space between the opposite substrate 20 and the liquid crystal apparatus substrate 30 cannot be controlled, resulting in a deterioration of display quality in the liquid crystal apparatus.

SUMMARY OF THE INVENTION

In view of the problems described above, it is an object of the present invention to achieve a liquid crystal apparatus and a method for fabricating the same in which dimensional accuracy in a space between an opposite substrate and a liquid crystal apparatus substrate is increased, and thus, display quality can be enhanced by improving the structure in which a lens array substrate and a sheet for covering the lens array substrate on the opposite substrate side are adhered to each other.

In order to solve the problems described above, in the present invention, an electro-optical device includes an electro-optical material enclosed between a pair of substrates. The pair of substrates includes a first substrate and a second substrate adhered together with a sealing material, and a plurality of pixels formed in a matrix are disposed within the pair of substrates. The first substrate includes a lens array substrate provided with a plurality of convex microlenses formed with one microlens corresponding to each of the plurality of pixels, a step portion being substantially equal in height to the microlenses in the region overlapping the sealing material, and a transparent cover adhered to the lens array substrate with an adhesive that covers the microlenses and the step portion.

In accordance with the present invention, when the first substrate provided with the plurality of microlenses is formed, a step portion being substantially equal in height to the microlenses is provided in the peripheral region (the region overlapping the region in which the sealing material is formed) located on the periphery of the region in which microlenses are formed. Thereby, when the lens array substrate and the transparent cover are adhered together with an adhesive layer during the formation of a second, opposite substrate, in the peripheral region located on the periphery of the region in which microlenses are formed, the lens array substrate and the transparent cover are adhered together with a thin adhesive layer. Since such a thin adhesive layer does not function as a cushion, when the first substrate is adhered to the second substrate with a sealing material, a force which presses one substrate to the other substrate is applied to the sealing material securely in the peripheral region located on the periphery of the region in which microlenses are formed. In addition, during the fabrication of the second, opposite substrate, when a polyimide resin or the like as an alignment layer is thermally cured, since the adhesive layer is thin, warpage, waviness, or the like does not occur in the second, opposite substrate due to stress from the adhesive layer. Therefore, a space between the first substrate and the second substrate can be controlled with high accuracy, resulting in an enhancement of display quality.

In the present invention, preferably, the step portion has a surface and the surface is planar. In such a structure, when a photo-curing resin is used as the sealing material and the sealing material applied between the first substrate and the second substrate is cured by light emitting from the side of the second substrate, the emitted light reaches the sealing material uniformly without being refracted. Thereby, the entire sealing material can be cured uniformly.

In a method for fabricating such an electro-optical device, in order to adhere the first substrate and the second substrate together, after one of the substrates is superposed on the other substrate with the sealing material therebetween, the sealing material is cured while applying pressure so as to press one of the substrates to the other substrate.

In such a case, in order to cure the sealing material, for example, ultraviolet light is emitted on the sealing material from the side of the second, opposite substrate.

An electro-optical device in accordance with the present invention can be used for an electronic apparatus such as a projection display device having a light source and projection device for projecting the light outgoing from the light source and modulated by the electro-optical device.

DETAILED DESCRIPTION OF PREFERRED EMBODIMENTS

Figure 11:
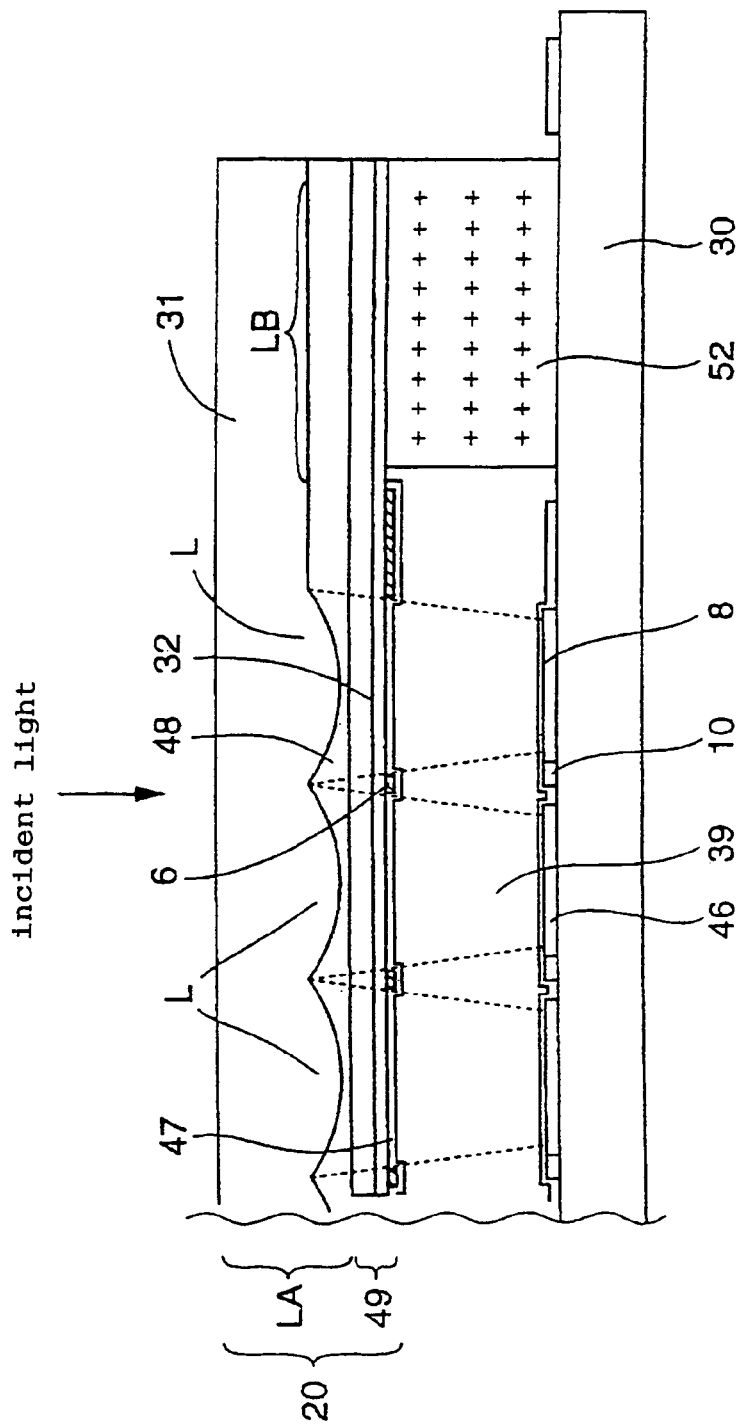
FIG. 11 is a sectional view of the end of a panel which shows a liquid crystal apparatus substrate and an opposite substrate used in a conventional liquid crystal apparatus, and a structure in which the substrates are adhered to each other.

Embodiments of the present invention will be described with reference to drawings. Since an embodiment of the liquid crystal apparatus has the same basic structure as that of the conventional liquid crystal apparatus described with reference to FIG. 11, the same reference numerals are used for parts with the same function.

Figure 1:
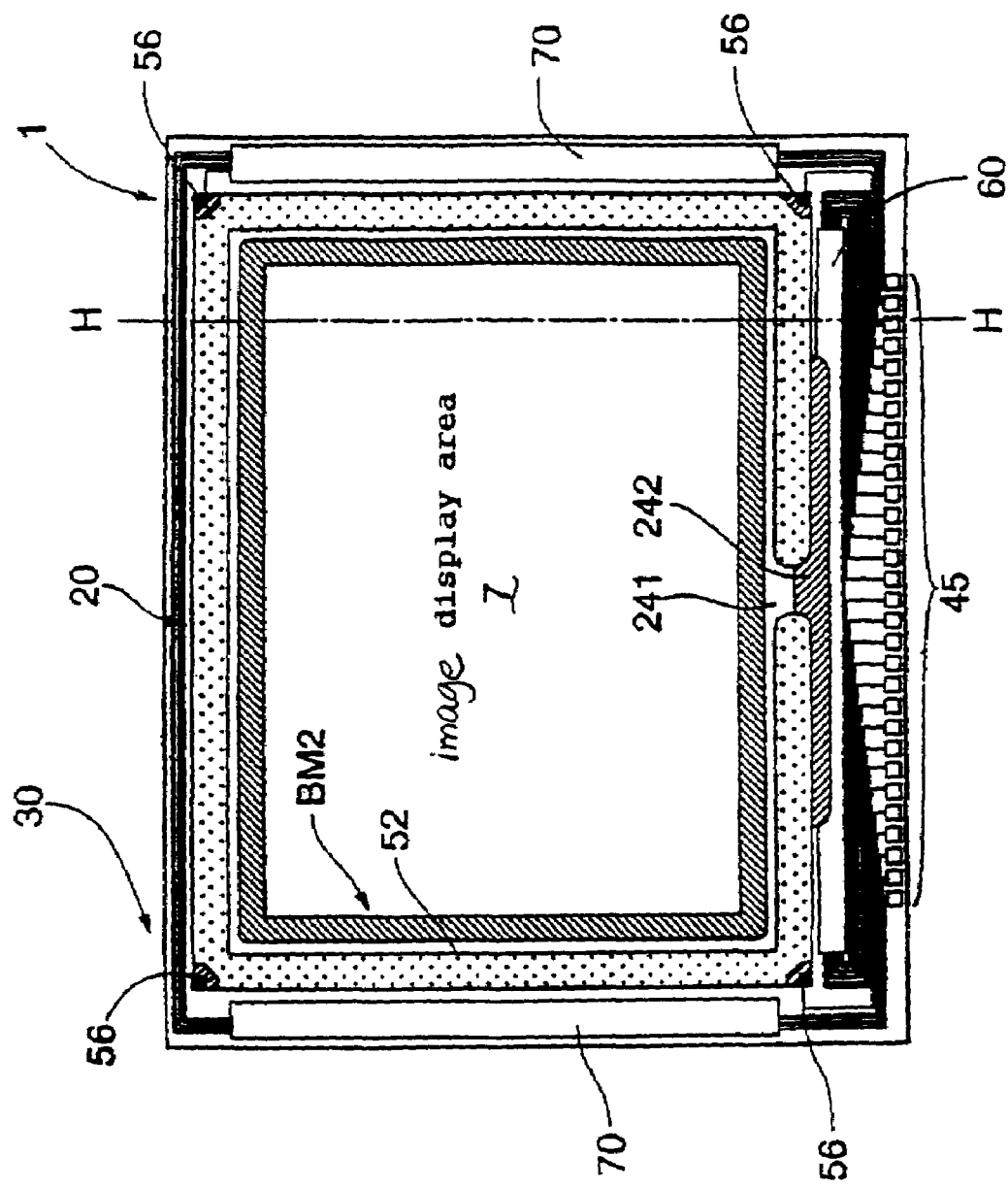
FIG. 1 is a plan view of a liquid crystal apparatus as an embodiment of the present invention taken from the side of an opposite substrate.
Figure 2:
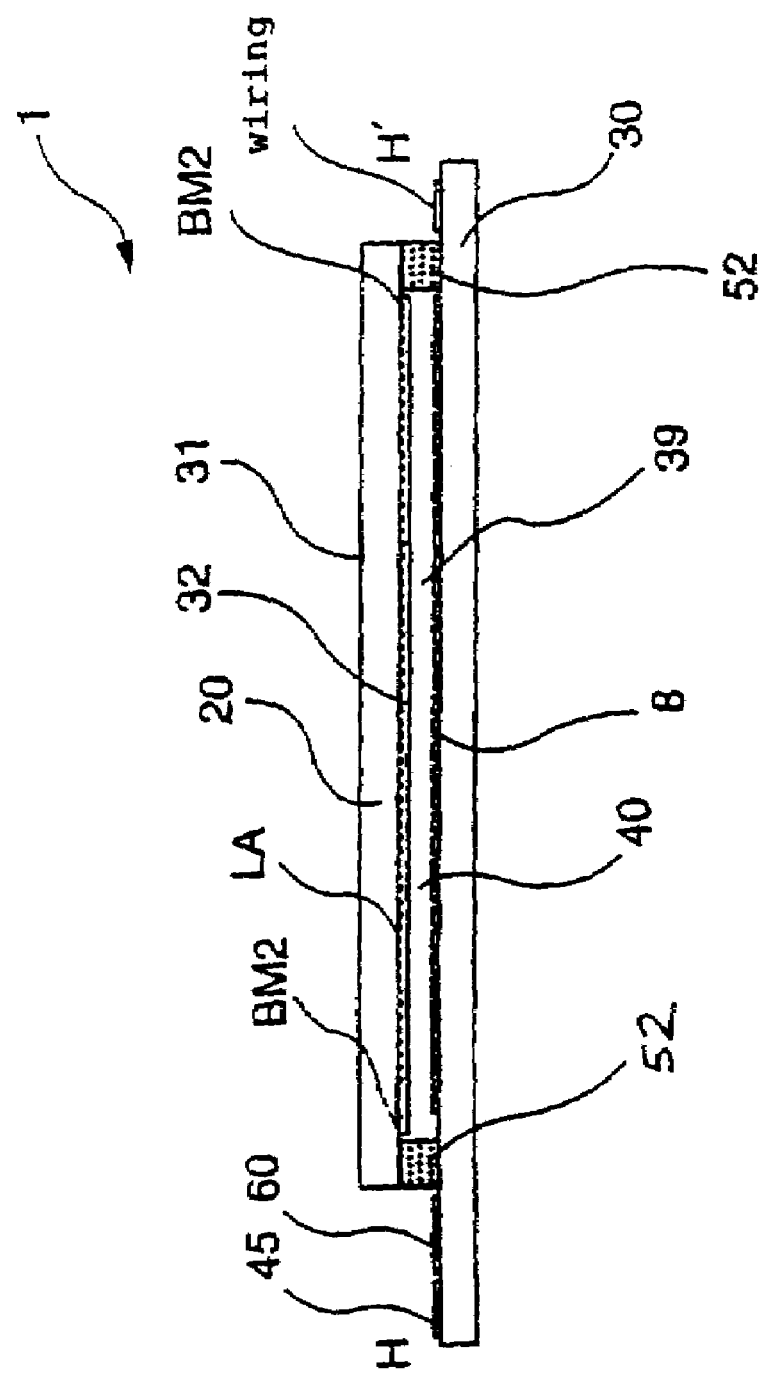
FIG. 2 is a sectional view of the liquid crystal apparatus shown in FIG. 1 taken along the line H–H'.

(General Configuration of the Liquid Crystal Apparatus)
FIG. 1 is a plan view of a liquid crystal apparatus as an embodiment taken from the side of an opposite substrate, and FIG. 2 is a sectional view of the liquid crystal apparatus shown in FIG. 1 taken along the line H–H'.

In FIGS. 1 and 2, a liquid crystal apparatus 1 substantially includes a liquid crystal apparatus substrate 30 provided with a pixel electrode 8 formed in a matrix, an opposite substrate 20 provided with an opposite electrode 32, and a liquid crystal 39 injected and retained between the substrates 20 and 30. The liquid crystal apparatus substrate 30 and the opposite substrate 20 are adhered to each other with a given space therebetween by a sealing material 52 containing a gap material formed along the periphery of the opposite substrate 20. A liquid crystal-enclosing region 40 is delimited by the sealing material 52 containing a gap material between the liquid crystal apparatus substrate 30 and the opposite substrate 20, and the liquid crystal 39 is injected in the liquid crystal-enclosing region 40. As the sealing material 52, an epoxy resin, various ultraviolet-curing resins, or the like can be used. As the gap material, inorganic or organic fibers, or spheres of approximately 2 μm to 10 μm, can be used.

The opposite substrate 20 is smaller than the liquid crystal apparatus substrate 30, and the liquid crystal apparatus substrate 30 is adhered to the opposite substrate 20 with the periphery of the liquid crystal apparatus substrate 30 extending from the outer periphery of the opposite substrate 20. Thereby, driving circuits (scanning line driving circuits 70 and a data line driving circuit 60) of the liquid crystal apparatus substrate 30 and input and output terminals 45 are exposed from the opposite substrate 20. Since the sealing material 52 is partially disconnected, the disconnected portion serves as a liquid crystal injection port 241. Thus, after the opposite substrate 20 and the liquid crystal apparatus substrate 30 are adhered to each other, if the area interior to the sealing material 52 is decompressed, the liquid crystal 39 can be injected with low pressure from the liquid crystal injection port 241. After the liquid crystal 39 is sealed, the liquid crystal injection port 241 is closed with a sealant 242. The opposite substrate 20 is provided with a light-shielding film BM2 for partitioning an image display area 7 along the internal circumference of the sealing material 52. In addition, each corner of the opposite substrate 20 is provided with a conducting material 56 for electrically connecting the liquid crystal apparatus substrate 30 and the opposite substrate 20.

If a delay of scanning signals supplied to the scanning line is not a problem, the scanning line driving circuit 70 disposed in one side may be sufficient. The data line driving circuit 60 may be placed on both sides along sides of the image display area 7. For example, data lines in odd columns may supply image signals from a data line driving circuit placed along one side of the image display area 7, and data lines in even columns may supply image signals from a data line driving circuit placed along the opposite side of the image display area 7. If data lines are driven comb-shaped as described above, the area in which the data line driving circuit 60 is formed can be expanded, enabling the configuration of a complex circuit. Also, in the liquid crystal apparatus substrate 30, a precharge circuit or a test circuit may be provided under the light-shielding film BM2 or the like on the side opposite to the data line driving circuit 60. Instead of forming the data line driving circuit 60 and the scanning line driving circuits 70 on the liquid crystal apparatus substrate 30, for example, a TAB (tape automated bonding) substrate mounted with a driving LSI may be electrically and mechanically connected to a terminal block formed on the periphery of the liquid crystal apparatus substrate 30 with an anisotropic conductive film therebetween. In addition, on the incident side surface or on the light-outgoing side of the opposite substrate 20 and the liquid crystal apparatus substrate 30, a polarizing film, a retardation film, a polarizer, and the like may be placed in a given direction depending on the type of the liquid crystal 39, that is, a performance mode such as a TN (twisted nematic) mode, an STN (super TN) mode, and a D-STN (double STN) mode, or a "normally white mode" or "normally black mode".

The liquid crystal apparatus 1 in this embodiment may be used, for example, in a projection liquid crystal apparatus (liquid crystal projector). In such a case, when three liquid crystal apparatuses 1 are used, each as a light valve for R, G, and B, into the individual liquid crystal apparatuses 1, each color light separated by dichroic mirrors for separating a beam into R, G, and B enters as a projection light respectively. In such a case, color filters are not formed. However, the projection liquid crystal apparatus is not limited to the structure in which three liquid crystal apparatuses 1 are used. In addition, by forming color filters for R, G, and B together with protective films in the region corresponding to the individual pixel electrodes 8 on the opposite substrate 20, in addition to the projective liquid crystal display, a color liquid crystal apparatus such as a color liquid crystal television may be configured. Additionally, by depositing numbers of interference layers having different refractive indices on the opposite substrate 20, a dichroic filter for forming R, G, and B colors using an interferential action of light may be formed. In accordance with the opposite substrate provided with the dichroic filter, brighter color display can be produced.

(Configuration of the Liquid Crystal Apparatus Substrate)

Figure 3:
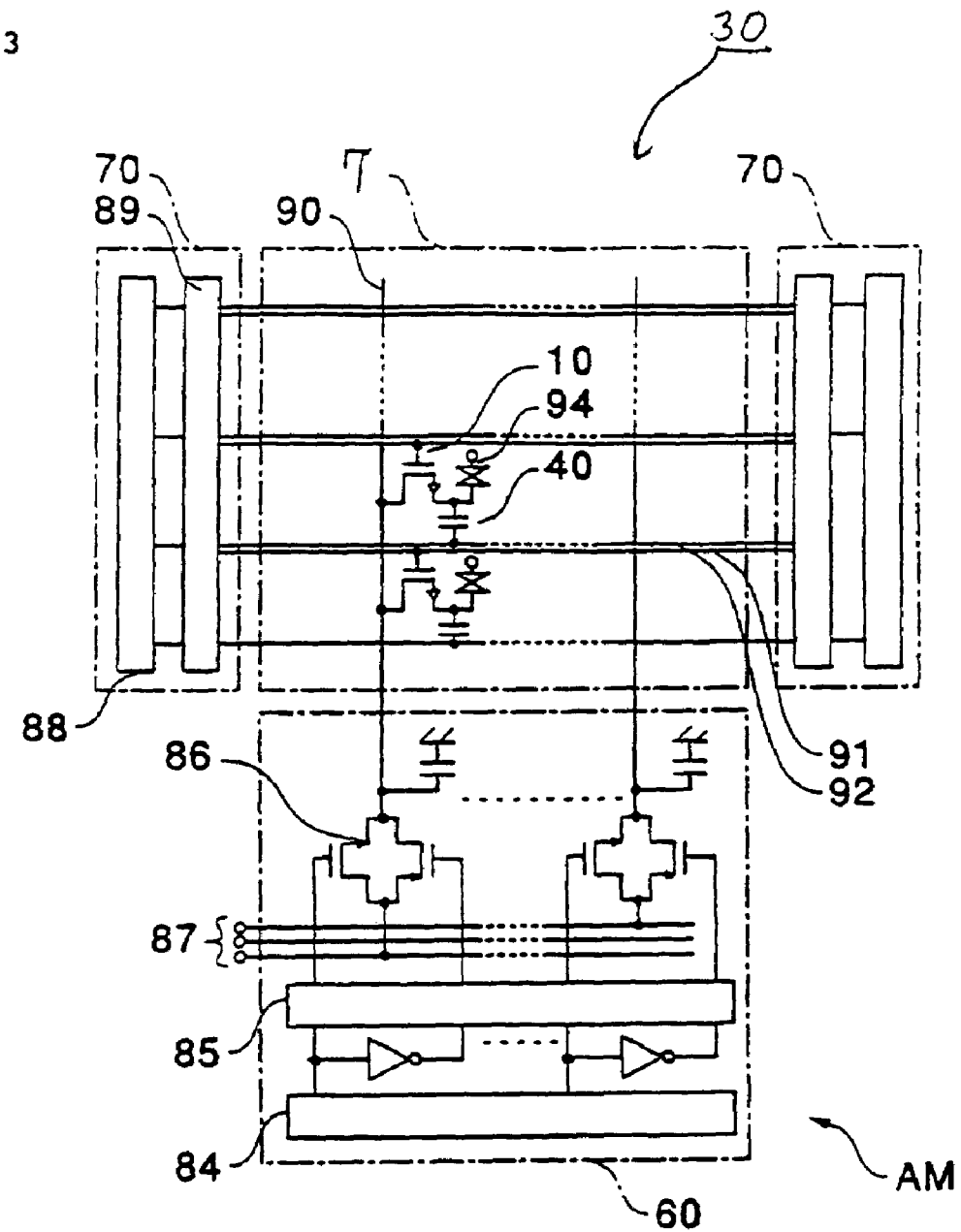
FIG. 3 is a block diagram which schematically shows a configuration of a liquid crystal apparatus.
Figure 4:
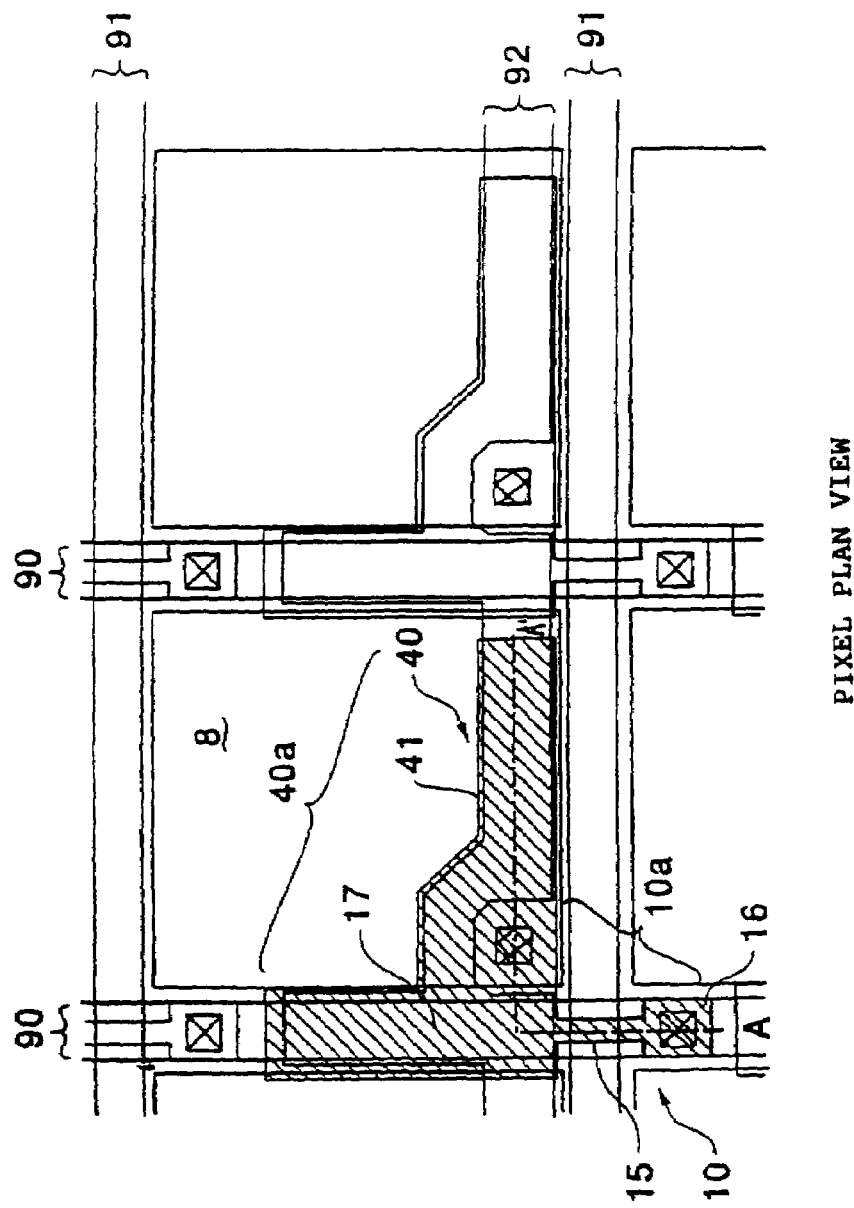
FIG. 4 is a plan view which shows a portion in the pixel region of the liquid crystal apparatus shown in FIG. 3.
Figure 5:
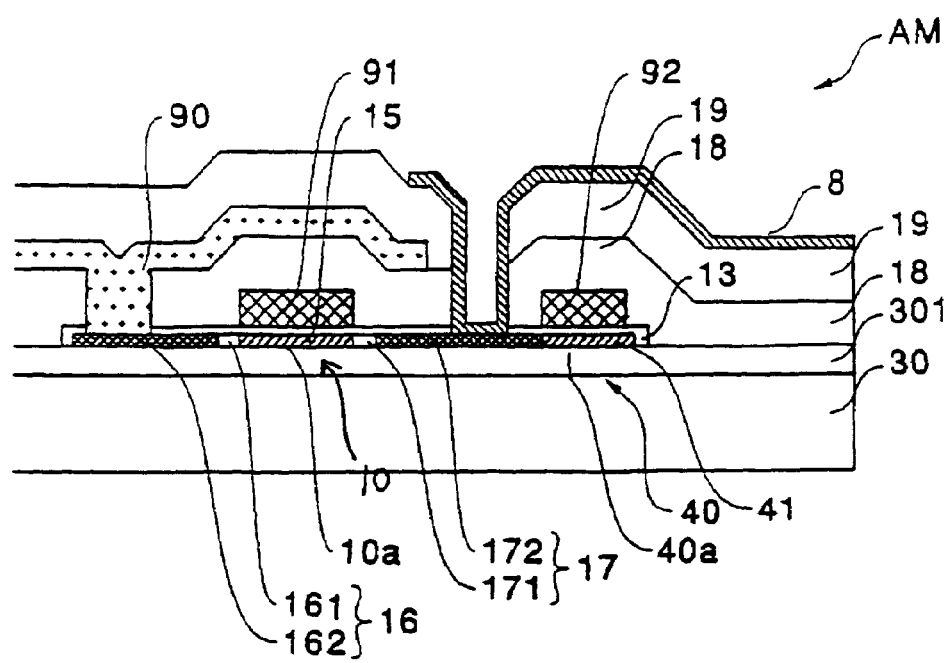
FIG. 5 is a sectional view of the liquid crystal apparatus substrate shown in FIG. 4 taken along the line A–A'.

FIG. 3 is a block diagram which schematically shows a configuration of a liquid crystal apparatus, FIG. 4 is a plan view which shows a portion in the pixel region in the liquid crystal apparatus shown in FIG. 3, and FIG. 5 is a sectional view of the liquid crystal apparatus substrate shown in FIG. 4 taken along the line A–A'.

As shown in FIG. 3, the liquid crystal apparatus substrate 30 in the liquid crystal apparatus is provided with a TFT 10 for pixel-switching which is connected to a data line 90 and a scanning line 91, and a liquid crystal cell 94 to which image signals are input from the data line 90 through the TFT 10. With respect to the data line 90, a data line driving circuit 60 provided with a shift register 84, a level shifter 85, a video line 87, and an analog switch 86 is formed. With respect to the scanning line 91, a scanning line driving circuit 70 provided with a shift register 88 and a level shifter 89 is formed.

A storage capacitor 40 (capacitance element) is formed in each pixel which includes a pixel electrode and a TFT for pixel-switching connected to the pixel electrode, and the storage capacitor 40 improves data retentivity of charges in the liquid crystal cell 94. The storage capacitor 40 may be formed using the adjacent scanning line 91 instead of providing a capacitance line.

In either case, as shown in FIG. 4, which is a partial plan view of the pixel region, a plurality of transparent pixel electrodes 8 are formed in a matrix, and data lines 90, scanning lines 91, and capacitance lines 92 are formed along the perpendicular or horizontal boundaries of the pixel electrodes 8. The data line 90 is electrically connected to a source region 16 in a semiconductor layer composed of a polysilicon film through a contact hole, and the pixel electrode 8 is electrically connected to a drain region 17 through a contact hole. The scanning line 91 extends facing the channel forming region 15. In the storage capacitor 40, a lower electrode 41 is formed of a silicon film 40a (a semiconductor film; the shaded region in FIG. 4) that is made conductive, which is an extension of a silicon film 10a (a semiconductor film; the shaded region in FIG. 4) for forming the TFT 10 for pixel-switching, and the capacity line 92 as an upper electrode overlies the lower electrode 41.

A cross section, taken along the line A–A', of the pixel region configured as described above is shown in FIG. 5. An insulating protective film 301 may be formed on the surface of a transparent substrate 30 as the base of the liquid crystal apparatus substrate 30, and island-like silicon films 10a and 40a are formed on the surface of the protective film 301. A gate insulating film 13 is formed on the surface of the silicon film 10a, and the scanning line 91 and a gate electrode are formed on the surface of the gate insulating film 13. A region in the silicon film 10a which faces the scanning line 91 through the gate insulating film 13 is a channel forming region 15. On one side of the channel forming region 15, a source region 16 including a low-concentration source region 161 and a high-concentration source region 162 is formed, and on the other side, a drain region 17 including a low-concentration drain region 171 and a high-concentration drain region 172 is formed. On the surface of the TFT 10 for pixel-switching configured as described above, a first interlayer insulating film 18 and a second interlayer insulating film 19 are formed, and the data line 90 formed on the surface of the first interlayer insulating film 18 is electrically connected to the high-concentration source region 172 through the contact hole formed in the first interlayer insulating film 18. The pixel electrode 8 is electrically connected to the high-concentration drain region 172 through the contact hole formed in the first interlayer insulating film 18 and the second interlayer insulating film 19. The lower electrode 41 composed of the low-concentration region is formed on the silicon film 40a extending from the high-concentration drain region 172, and the capacitance line 92 faces the lower electrode 41 with an insulating film (dielectric film) simultaneously formed with the gate insulating film 13 therebetween. In such a manner, the storage capacitor 40 is formed.

Although the TFT 10 preferably has an LDD structure as described above, the TFT 10 may have an offset structure in which impurity ion implantation is not performed to a region corresponding to the low-concentration source region 161 and the low-concentration drain region 171. Additionally, the TFT 10 may be of the self-aligned type in which impurity ion implantation is performed to a high concentration with the scanning line 91 serving as a mask and high-concentration source and drain regions are formed in a self-aligned manner. Although the present embodiment has a single gate structure in which only one gate electrode (scanning line 91) of the TFT 10 is disposed between the source region and the drain region, two or more gate electrodes may be disposed between them. In such a case, the individual gate electrodes have the same signals applied thereto. If the TFT 10 having a dual gate (double gate), triple gate, or greater is configured as described above, a leakage current at the junction between the channel region and the source region or the drain region can be prevented, and thus, an off-state current can be reduced. If at least one of the gate electrodes have an LDD structure or an offset structure, an off-state current can be further reduced, resulting in a stable switching element.

(Configuration of the Opposite Substrate)

Figure 6:
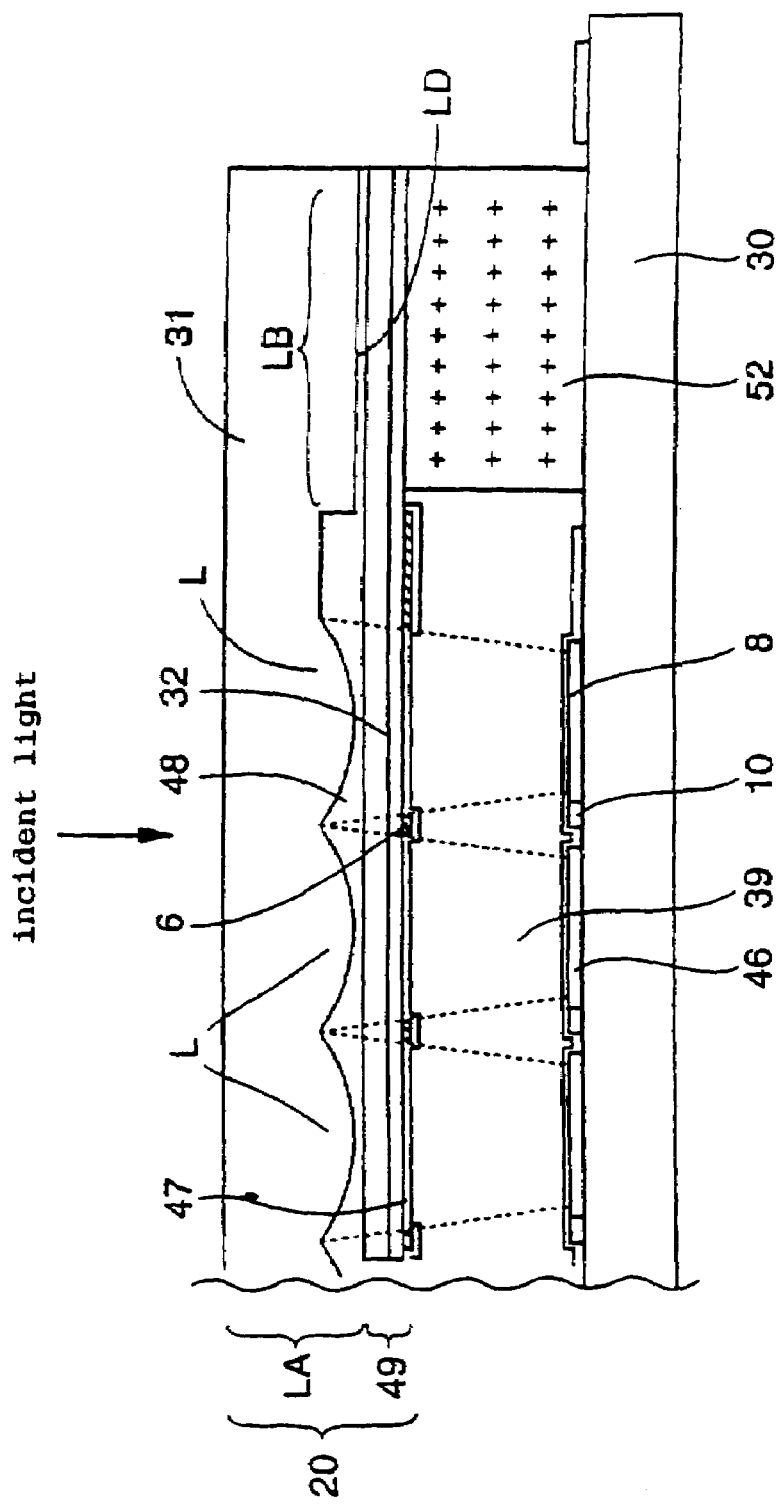
FIG. 6 is a sectional view of the end of a panel which shows a liquid crystal apparatus substrate and an opposite substrate in a liquid crystal apparatus as an embodiment of the present invention, and a structure in which the substrates are adhered to each other.

In FIG. 6, an opposite substrate 20 includes a lens array substrate LA in which a plurality of convex microlenses (small condenser lenses), which protrude toward the individual pixel electrodes 8, are formed in a matrix corresponding to the individual pixel electrodes 8 on a liquid crystal apparatus substrate 30, and a transparent glass sheet 49 adhered to the lens array substrate LA by an adhesive 48 so as to cover the microlenses L. An opposite electrode 31 is formed on the surface of the glass sheet 49, and a light-shielding film 6 is formed on the opposite electrode 31 in the region corresponding to the boundary region of the microlenses L. In addition, on the surface of the glass sheet 49, a polyimide resin layer 47 as an alignment film is formed on the surface of the opposite electrode 32 and the light-shielding film 6.

In a liquid crystal apparatus 1 which uses the opposite substrate 20 having such a configuration, among light entering from the side of the opposite substrate 20, the light emitted to the channel forming region of the TFT 10 or the like is shielded by the light-shielding film 6, and light entering obliquely or the like is condensed toward the individual pixel electrodes 8 by the individual microlenses L. Therefore, even if the width of the light-shielding film 6 formed on the side of the opposite substrate 20 is narrow, or if there is no light-shielding film 6 on the side of the opposite substrate 20, light can be prevented from entering the channel forming region of the TFT 10 by the microlenses L. Thus, the deterioration of transistor characteristics of the TFT 10 can be prevented, resulting in improvement in reliability. In addition, since the width of the light-shielding film 6 formed on the side of the opposite substrate 20 can be reduced, or the light-shielding film 6 can be omitted from the side of the opposite substrate 20, a decrease in the amount of light for display due to the light-shielding film 6 can be prevented. Thereby, contrast and brightness can be significantly improved in the liquid crystal apparatus.

In the opposite substrate 20 having the configuration described above, although in the known lens array substrate LA, the peripheral region LB (the region overlapping the region in which a sealing material 52 containing a gap material is formed) in the region in which microlenses L are formed is lower in height in comparison with the microlenses L, in this embodiment, a step portion LD is formed so that the peripheral region LB corresponding to the periphery of the opposite substrate 20 has the same height as that of the microlenses L. Therefore, in this embodiment, the opposite substrate 20 and the glass sheet 49 are adhered to each other with a thin layer of the adhesive 48 in the peripheral region LB of the region in which microlenses L are formed. The thin layer of the adhesive 48 in the peripheral region LB is less than the height of the microlenses L. Therefore, in the fabrication method as described below, the liquid crystal apparatus substrate 30 and the opposite substrate 20 can be bonded to each other with a space having high dimensional accuracy therebetween.

(Method for Fabricating the Liquid Crystal Apparatus)

(Method for Fabricating the Opposite Substrate 20)

FIGS. 7(A) through FIG. 7(E) and FIGS. 8(A) through FIG. 8(C) are sectional views which show the steps of a method for fabricating a lens array substrate LA used for the opposite substrate 20 in this embodiment.

Figure 7A:
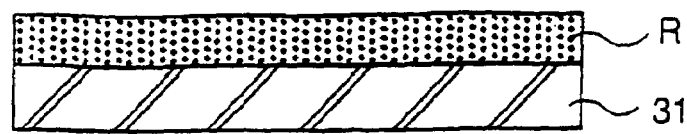
FIGS. 7(A) through 7(E) are sectional views which show the steps of a method for fabricating a lens array substrate used for the opposite substrate shown in FIG. 6.

First, as shown in FIG. 7(A), a resist layer R having uniform thickness is formed on a transparent substrate 31 as a base of the lens array substrate LA. The resist layer R is photosensitive as well as thermally deformative.

Figure 7B:
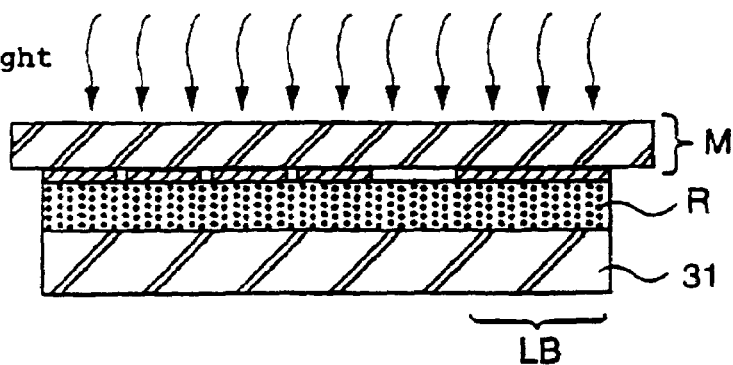

Next, as shown in FIG. 7(B), in the transparent substrate 31, a mask M having the region to be etched as a positive image is aligned so as to overlap the resist layer R, and exposure is performed on the resist layer R by radiating ultraviolet light or the like through the mask M. In this embodiment, since the peripheral region LB of the region in which microlenses L are formed is left as a step portion LD having the same height as that of the microlenses L, the resist layer R formed in the peripheral region LB is not exposed.

Figure 7C:
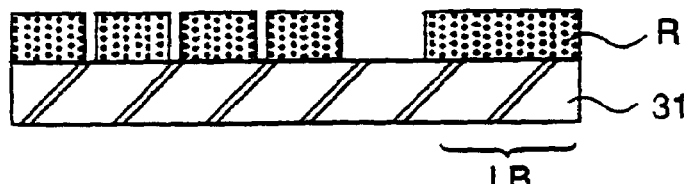

Next, as shown in FIG. 7(C), the resist layer R is developed after exposure, and the exposed portions are stripped. As a result, the resist layer R remains in the portions in which microlenses L are formed and in the peripheral region LB of the region in which microlenses L are formed.

Then, in the state shown in FIG. 7(C), a heating process is carried out. As a result, the resist layer R is softened, and because of the thermal deformation and the action of surface tension, corners of the resist layer R are rounded as shown in FIG. 7 (D).

Next, dry-etching is performed to the surface in which the convex resist layers R are disposed in a matrix as described above. For example, if a gas containing oxygen is used for the dry-etching, the etching affects not only the transparent substrate 31 but also the resist layers R. As a result, in FIG. 7(E), as the shape before etching is shown by the dotted lines and the shape after etching is shown by the solid line, a lens array substrate LA in which microlenses L are formed on the surface of the transparent substrate 31 is fabricated. A step portion LD is also formed in the peripheral region LB of the region in which microlenses L are formed.

Figure 7D:
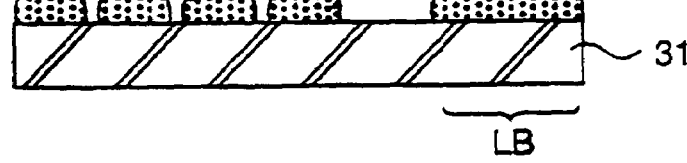
Figure 7E:
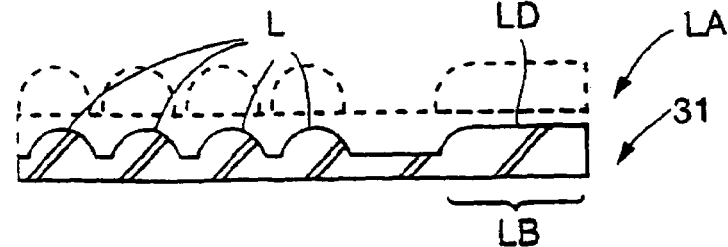
Figure 8:
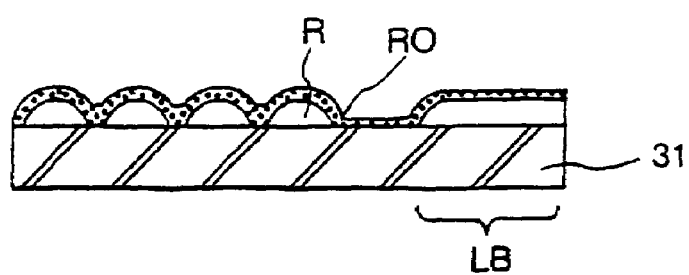
FIGS. 8(A) through 8(C) are sectional views which show the steps of a method for fabricating a lens array substrate, which is different from the method shown in FIGS. 7(A) through 7(E).
Figure 8:
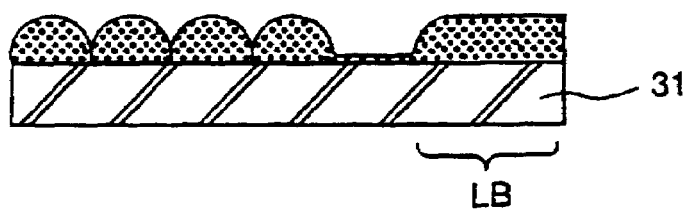
Figure 8C:
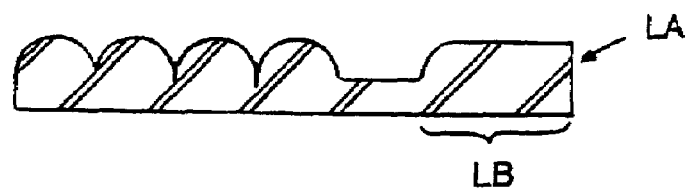

Although when the lens array substrate LA is fabricated in the method described above, the individual microlenses L lie slightly apart from each other, in order to form microlenses L which are entirely connected to each other, after rounding the corners of the resist layers R as shown in FIG. 7(D), another resist layer RO is applied thereon as shown in FIG. 8(A), and then the resist layer RO is photo-cured. Next, by heating the resist layer RO, a resist layer R in which smooth convex surfaces are connected to each other can be formed as shown in FIG. 8(B). Then, dry-etching is performed to the surface in which the convex resist layers R are disposed in a matrix. For example, if a gas containing oxygen is used for the dry-etching, since the etching affects both the resist layer R and the transparent substrate 31, as shown in FIG. 8(C), a lens array substrate LA in which microlenses L are connected to each other can be formed on the surface of the transparent substrate 31.

Next, a glass sheet 49 is adhered to the lens array substrate LA fabricated as described above, as shown in FIG. 6, with an adhesive 48 so as to cover the microlenses L and the step portion LD. Since the peripheral region LB (the region overlapping the region in which the sealing material 52 is formed) of the region in which microlenses L are formed is not etched when the lens array substrate LA is fabricated by etching the surface of the transparent substrate 31 using a photolithographic technique, a step portion LD having the same height as that of the microlenses L is formed on the side of the opposite substrate 20 in the region overlapping the region in which the sealing material 52 is formed. Therefore, when the lens array substrate LA and the glass sheet 49 are adhered to each other with the adhesive 48, the peripheral region LB in the region in which microlenses L are formed is adhered with a thin layer of the adhesive 48.

After the glass sheet 49 is adhered to the lens array substrate LA with the adhesive 48 so as to cover the microlenses L and the step portion LD, the surface of the glass sheet 49 is polished so that the opposite substrate 20 is made parallel.

Next, on the surface of the glass sheet 49, an opposite electrode 32 and a light-shielding film 6 are formed in sequence.

With respect to the opposite substrate 20, after a polyimide resin 47 is thinly applied to the surface of the light-shielding film 6 and the opposite electrode 32, thermal curing is performed at temperatures of approximately 150 to 200° C. Even if the opposite substrate 20 is heated when the polyimide resin 47 is thermally cured on the surface of the opposite substrate 20 in such a manner, since the lens array substrate LA and the glass sheet 49 are adhered to each other with the thin layer of the adhesive 48 in the peripheral region LB of the region in which microlenses L are formed, warpage, waviness, or the like does not occur on the opposite substrate 20 due to stress from the adhesive 48 in this region.

After the layer of the polyimide resin 47 is formed on the side of the opposite substrate 20 as described above, rubbing treatment is performed.

(Step of Adhering the Liquid Crystal Apparatus Substrate 30 to the Opposite Substrate 20)

On the other hand, on the surface of a liquid crystal apparatus substrate 30 formed separately from the opposite substrate 20, as shown in FIG. 6, after a layer of a polyimide resin 46 is formed, rubbing treatment is performed.

Next, a sealing material 52 containing a gap material is applied to the surface of the liquid crystal apparatus substrate 30.

Next, after the opposite substrate 20 and the liquid crystal apparatus substrate 30 are aligned so that the individual microlenses L face the individual pixel electrodes 8 formed on the liquid crystal apparatus substrate 30, ultraviolet light is emitted at an illuminance of 30 mW/cm$^2$ to 150 mW/cm$^2$ on the sealing material 52 from the side of the opposite substrate 20 for several seconds, for example, 3 to 7 seconds, while the opposite substrate 20 is being pressed to the liquid crystal apparatus substrate 30 to preliminarily cure the sealing material 52. As a result, the opposite substrate 20 and the liquid crystal apparatus substrate 30 are adhered to each other with a predetermined space therebetween.

Ultraviolet light is then emitted on the sealing material 52 from the side of the opposite substrate 20 at an illuminance of 110 mW/cm$^2$ to 120 mW/cm$^2$ for several tens of seconds, for example, 34 seconds, followed by cooling for 20 seconds. Next, ultraviolet light is emitted on the sealing material 52 from the side of the liquid crystal apparatus substrate 30 at an illuminance of 110 mW/cm$^2$ to 120 mW/cm$^2$ for tens of seconds, for example, 38 seconds, followed by cooling for 20 seconds. The exposure from the side of the opposite substrate 20 and the exposure from the side of the liquid crystal apparatus substrate 30 are alternately carried out in 4 cycles to post-cure the sealing material 52. As a result, the opposite substrate 20 and the liquid crystal apparatus substrate 30 are completely adhered to each other.

Since the step portion LD having the height equal to that of the microlenses L is formed in the region (peripheral region LB) overlapping the region in which sealing material 52 is formed on the side of the opposite substrate 20, the adhesive 48 for adhering the opposite substrate 20 and the glass sheet 49 to each other is thinly applied in the peripheral region LB of the region in which microlenses L are formed (the region overlapping the region in which the sealing material 52 is formed). Such a thin adhesive layer of the adhesive 48 does not function as a cushion when the opposite substrate 20 is pressed to the liquid crystal apparatus substrate 30. Therefore, in the region in which the sealing material 52 is formed, the sealing material 52 can be preliminarily cured while the opposite substrate 20 is being appropriately pressed to the liquid crystal apparatus substrate 30. In addition, even if the opposite substrate 20 is heated in order to cure the polyimide resin 47 on the surface of the opposite substrate 20, the thin adhesive 48 which adheres the opposite substrate 20 to the glass sheet 49 in the peripheral region LB of the region in which the microlenses L are formed does not cause warpage, waviness, or the like on the opposite substrate 20 due to stress. Therefore, a space between the opposite substrate 20 and the liquid crystal apparatus substrate 30 can be controlled with high accuracy, resulting in an enhancement of display quality.

Additionally, when an uneven step portion LD is formed, the opposite substrate 20 and the glass sheet 49 can also be adhered to each other with the thin adhesive 48 in the peripheral region LB of the region in which microlenses L are formed (the region overlapping the region in which the sealing material 52 is formed). However, in this embodiment, since the step portion LD is planar, when a photo-curing resin is used as the sealing material 52 and the sealing material 52 is cured by the light emitted from the side of the opposite substrate 20, the emitted light reaches the sealing material without refraction. Thereby, the entire sealing material 52 can be photo-cured uniformly.

Although the substrate provided with TFTs formed in a matrix is used in the above embodiment, the present invention is not limited to such TFTs. In a liquid crystal apparatus in which pixels are formed in a matrix, the present invention is applicable to the configuration in which microlenses are formed corresponding to the individual pixels. Although microlenses are provided on the side of the opposite substrate in the embodiment described above, the present invention is not limited to this. When microlenses are formed on the liquid crystal apparatus substrate, the same advantage as that in the embodiment may be achieved by providing a step portion on the periphery of the substrate in response to the height of the microlenses.

(Application of the Liquid Crystal Apparatus to an Electronic Apparatus)

Next, an example of electronic apparatuses provided with the liquid crystal apparatus will be described with reference to FIGS. 9 and 10.

Figure 9:
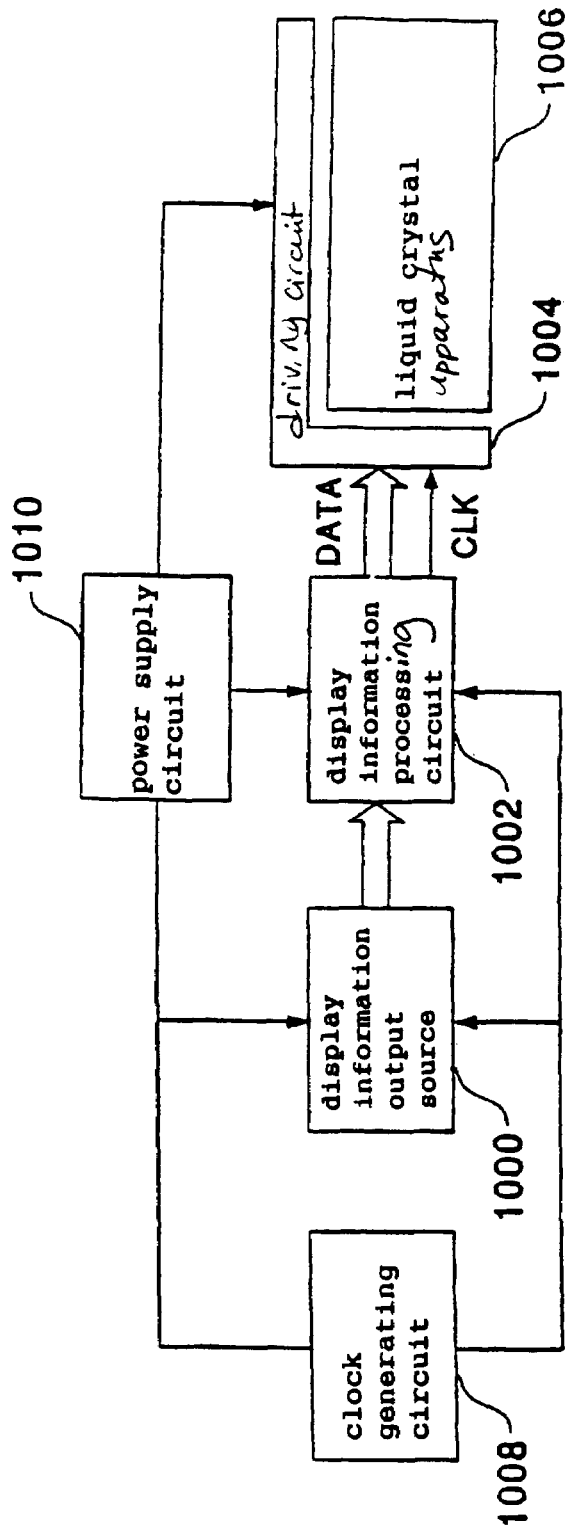
FIG. 9 is a block diagram which shows the circuit structure of a liquid crystal apparatus as an example of usage of the liquid crystal apparatus shown in FIG. 8.

First, FIG. 9 is a block diagram which shows the structure of an electronic apparatus provided with a liquid crystal apparatus 1006 having the same configuration as that of the liquid crystal apparatus in accordance with the embodiment described above.

In FIG. 9, the electronic apparatus includes a display information output source 1000, a display information processing circuit 1002, a driving circuit 1004, a liquid crystal apparatus 1006, a clock generating circuit 1008, and a power supply circuit 1010. The display information output source 1000, which includes a memory such as a ROM (Read Only Memory), an R30 (Random Access Memory), an optical disk, and a tuning circuit in which video signals of television signals are tuned and output, processes image signals having a predetermined format and outputs the image signals to the display information processing circuit 1002 in response to a clock signal from the clock generating circuit 1008. The display information processing circuit 1002, which includes the various known processing circuits such as an amplifying polarity-inverting circuit, a phase-expansion circuit, a rotation circuit, a gamma correction circuit, or a clamp circuit, produces digital signals sequentially from the display information input in response to clock signals and outputs the digital signals together with clock signals CLK to the driving circuit 1004. The driving circuit 1004 drives the liquid crystal apparatus 1006. The power supply circuit 1010 supplies predetermined power to the individual circuits described above. The driving circuit 1004 may be formed on a liquid crystal apparatus substrate which is a component of the liquid crystal apparatus 1006. In addition, the display information processing circuit 1002 may be formed on the liquid crystal apparatus substrate.

Electronic apparatuses having such a structure include a projection liquid crystal apparatus (liquid crystal projector) which will be described below with reference to FIG. 10, a multimedia personal computer (PC), an engineering work station (EWS), a pager or cordless telephone, a word processor, a television, a viewfinder type or monitor-direct-view type video tape recorder, an electronic pocket diary, an electronic calculator, a car navigation device, a POS terminal, a touch panel, and so on.

Figure 10:
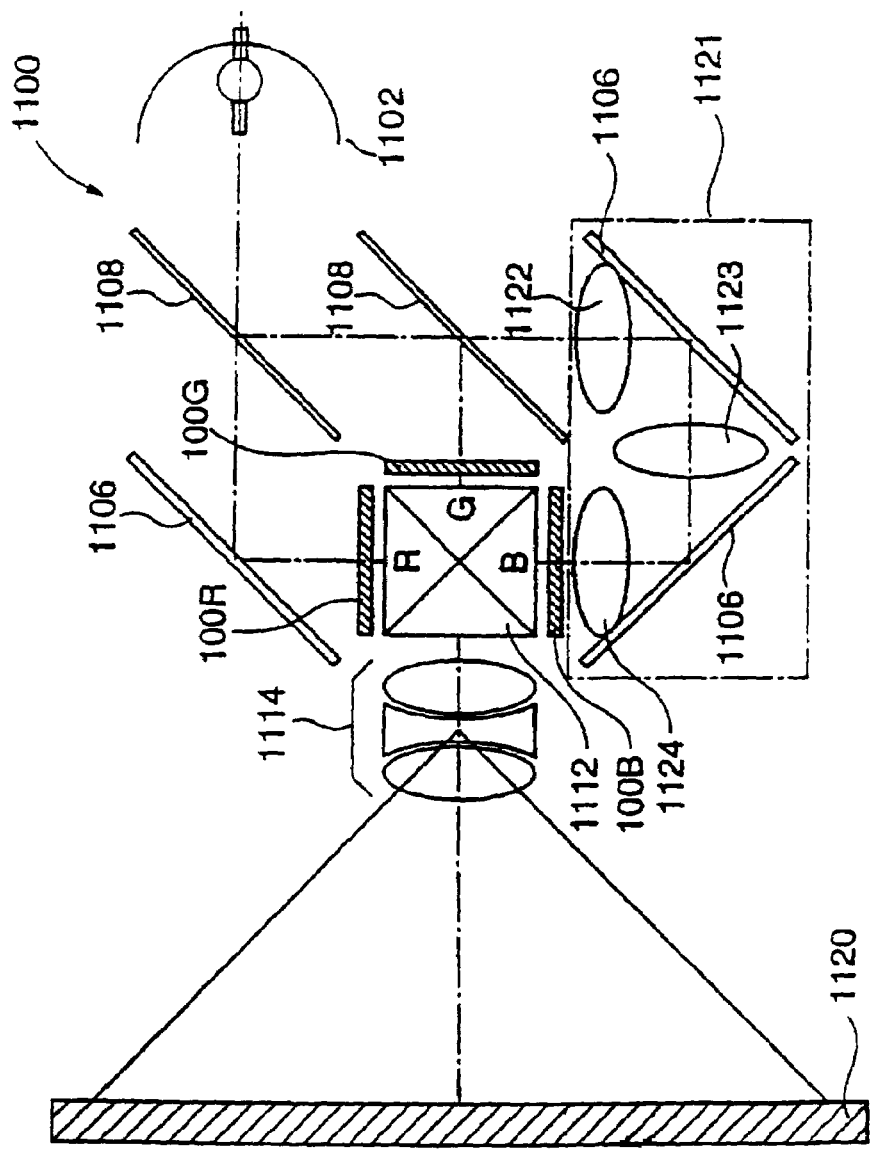
FIG. 10 is a diagram of a projection liquid crystal apparatus as an example of usage of the liquid crystal apparatus shown in FIG. 8.

In a projection liquid crystal apparatus (projector) 1100 shown in FIG. 10, four liquid crystal modules including a liquid crystal apparatus in which the driving circuit 1004 is mounted on a liquid crystal apparatus substrate are prepared, and each module is used as a light valve 100R, 100G, or 100B for R, G, or B, respectively. In the liquid crystal projector 1100, when light is emitted from a lamp unit 1102 as a white light source such as a metal halide lamp, it is separated into three light components R, G, and B corresponding to three primary colors R, G, and B by three mirrors 1106 and two dichroic mirrors 1108 (light separating system), and the three light components are guided to the corresponding light valves 100R, 100G, and 100B (liquid crystal apparatus 100/liquid crystal light valves), respectively. At this stage, since the light component B has a long light path, in order to prevent light loss, it is guided through a relay lens system 1121 which includes an incident side lens 1122, a relay lens 1123, and an emitting side lens 1124. The light components R, G, and B corresponding to three primary colors modulated by the light valves 100R, 100G, and 100B, respectively, enter into a dichroic prism 1112 (color synthesizing system) from three directions and are synthesized, and then are projected to a screen 1120 or the like through a projection lens 1114 as a color image.

Although a liquid crystal apparatus is described as an electro-optical device in the above embodiment, the present invention is not limited to this, and the present invention may be applicable to various electro-optical devices such as electroluminescent devices.

[Advantages]

As described above, in an electro-optical device in accordance with the present invention, since a step portion having substantially the same height as that of microlenses is formed in the peripheral region (the region overlapping the region in which the sealing material is formed) of the region in which microlenses are formed with respect to the surface of an opposite substrate, when the opposite substrate and a transparent sheet are adhered to each other with an adhesive layer, the opposite substrate and the transparent sheet are adhered to each other with a thin adhesive layer in the peripheral region of the region in which microlenses are formed. Since such a thin adhesive layer does not function as a cushion, when the opposite substrate and the electro-optical device substrate are adhered to each other with a sealing material, a force pressing the opposite substrate to the electro-optical device substrate is securely applied to the sealing material in the region peripheral to the region in which microlenses are formed. Also, during the fabrication of the opposite substrate, when a polyimide resin or the like as an alignment layer is thermally cured, since the adhesive layer is thin, warpage, waviness, or the like does not occur in the opposite substrate due to stress from the adhesive layer. Therefore, a space between the opposite substrate and the electro-optical device substrate can be controlled with high accuracy, resulting in enhancement of display quality in the electro-optical device.

What is claimed is:

1. A method for fabricating an electro-optical device which comprises a pair of substrates including a first substrate and a second substrate, a liquid crystal enclosed between the pair of substrates, and a plurality of pixels formed in a matrix disposed within said pair of substrates, said first substrate including a lens array substrate, said method comprising:

forming a plurality of convex microlenses with one microlens corresponding to each of said plurality of pixels on said lens array substrate;

forming a step portion substantially equal in height to said microlenses throughout a periphery of said first substrate;

adhering a transparent cover to said lens array substrate with an adhesive to cover said microlenses and said step portion, wherein the adhesive over the step portion is a thin layer, the thin layer includes a height that is less than the height of the adhesive over an inter lens positions adjacent to ones of the microlenses;

forming a sealing material of photo curing resin, the width of the step portion being greater than a maximum width of the sealing material;

superposing the first substrate on the second substrate to face said step portion with the sealing material therebetween, the periphery of the first substrate completely overlapping the sealing material; and curing said sealing material while pressing said first substrate on the second substrate, wherein the curing is performed by emitting light to said sealing material through said step portion.

2. The method for fabricating an electro-optical device according to claim 1, said sealing material comprising a photo-curing resin.

3. A method for fabricating an electro-optical device which comprises a pair of substrates including a first substrate and a second substrate, an electro-optical material enclosed between the pair of substrates, and a plurality of pixels formed in a matrix disposed within said pair of substrates, said first substrate including a lens array substrate, said method comprising:

forming a plurality of convex microlenses with one microlens corresponding to each of said plurality of pixels on said lens array substrate;

forming a step portion substantially equal in height to said microlenses throughout a periphery of said lens array substrate;

bonding a transparent cover to said lens array substrate with an adhesive so as to cover said microlenses and said step portion, wherein the adhesive over the step portion is a thin layer, the thin layer includes a height that is less than the height of the adhesive over an inter lens positions adjacent to ones of the microlenses;

forming a sealing material of photo curing resin, the width of the step portion being greater than a maximum width of the sealing material;

superposing the first substrate on the second substrate to face said step portion with said sealing material therebetween, the periphery of the first substrate completely overlapping the sealing material; and curing said sealing material while applying pressure from an exterior of said pair of substrates, wherein the curing is performed by emitting light to said sealing material through said step portion.

4. The method for fabricating an electro-optical device according to claim 3, said sealing material comprising a photo-curing resin.

5. A method for fabricating an electro-optical device which comprises a pair of substrates including a first substrate and a second substrate, an electro-optical material enclosed between the pair of substrates, and a plurality of pixels formed in a matrix disposed within said pair of substrates, said first substrate including a lens array substrate, said method comprising:

forming a plurality of convex microlenses with one microlens corresponding to each of said plurality of pixels on said lens array substrate;

forming a step portion substantially equal in height to said microlenses by etching said lens array substrate;

adhering a transparent cover to said lens array substrate with an adhesive to cover said microlenses and said step portion, wherein the adhesive over the step portion is a thin layer, the thin layer includes a height that is less than the height of the adhesive over an inter lens positions adjacent to ones of the microlenses;

forming a sealing material of photo curing resin, the width of the step portion being greater than a maximum width of the sealing material;

superposing the first substrate on the second substrate to face said step portion with the sealing material therebetween; and curing said sealing material while pressing said first substrate on the second substrate, wherein the curing is performed by emitting light to said sealing material through said step portion.

* * * * *